(12) United States Patent
Mao et al.

(10) Patent No.: US 9,118,520 B1
(45) Date of Patent: Aug. 25, 2015

(54) SYSTEMS AND METHODS FOR MONITORING APPLICATION RESOURCE USAGE ON MOBILE COMPUTING SYSTEMS

(75) Inventors: Jun Mao, Culver City, CA (US); Xue Feng Tian, Beijing (CN); Peng Xiong, Beijing (CN)

(73) Assignee: Symantec Corporation, Mountain View, CA (US)

( * ) Notice: Subject to any disclaimer, the term of this patent is extended or adjusted under 35 U.S.C. 154(b) by 116 days.

(21) Appl. No.: 13/452,719

(22) Filed: Apr. 20, 2012

(51) Int. Cl.
| | |
|---|---|
| *H04L 29/06* | (2006.01) |
| *G06F 1/32* | (2006.01) |
| *G06Q 10/04* | (2012.01) |
| *G06F 9/445* | (2006.01) |
| *H04W 52/02* | (2009.01) |

(52) U.S. Cl.
CPC .......... *H04L 29/06* (2013.01); *G06F 1/32* (2013.01); *G06Q 10/04* (2013.01); *G06F 1/324* (2013.01); *G06F 8/61* (2013.01); *H04W 52/0261* (2013.01)

(58) Field of Classification Search
CPC ............... G01R 31/3648; H04L 29/06; H04L 29/08072; G06F 8/41; G06F 8/61; G06F 1/324; G06F 1/3206; G06F 1/32; G06F 11/1469; H04W 52/0261; G06Q 10/04
USPC ............ 702/63; 709/224, 227, 232; 717/140, 717/174; 455/573; 370/311; 713/320; 725/40; 718/100
See application file for complete search history.

(56) References Cited

U.S. PATENT DOCUMENTS

| | | | | |
|---|---|---|---|---|
| 6,564,073 | B1* | 5/2003 | Uggmark et al. | 455/573 |
| 6,917,971 | B1* | 7/2005 | Klein | 709/224 |
| 7,174,379 | B2* | 2/2007 | Agarwal et al. | 709/226 |
| 7,219,245 | B1* | 5/2007 | Raghuvanshi | 713/322 |
| 7,693,983 | B1* | 4/2010 | Gupta et al. | 709/224 |
| 8,359,389 | B1* | 1/2013 | Cohen et al. | 709/224 |
| 2003/0140147 | A1* | 7/2003 | Gavish et al. | 709/227 |
| 2003/0140161 | A1* | 7/2003 | Hayduk | 709/232 |
| 2006/0265726 | A1* | 11/2006 | Byun et al. | 725/40 |
| 2008/0005736 | A1* | 1/2008 | Apacible et al. | 718/100 |
| 2008/0165714 | A1* | 7/2008 | Dettinger et al. | 370/311 |
| 2009/0164152 | A1* | 6/2009 | Creus et al. | 702/63 |
| 2010/0005326 | A1* | 1/2010 | Archer et al. | 713/320 |
| 2011/0126188 | A1* | 5/2011 | Bernstein et al. | 717/174 |
| 2011/0276951 | A1* | 11/2011 | Jain | 717/140 |

OTHER PUBLICATIONS

Timothy T Allen, Energy Equations, 2001, Keene State College, p. 1, http://tim.thorpeallen.net/Courses/Reference/energyEquations.pdf.*

* cited by examiner

*Primary Examiner* — Oleg Survillo
*Assistant Examiner* — Schquita Goodwin
(74) *Attorney, Agent, or Firm* — ALG Intellectual Property, LLC

(57) ABSTRACT

A computer-implemented method for monitoring application resource usage on mobile computing systems may include 1) identifying a mobile computing system that is configured to execute one application at a time as a foreground application, 2) identifying a request to determine a resource consumption level of an application on the mobile computing system, 3) identifying, in response to the request, at least one frequency level at which a processor of the mobile computing system operates while the application executes as the foreground application, and 4) determining, based on the identified frequency level, the resource consumption level of the application. Various other methods, systems, and computer-readable media are also disclosed.

20 Claims, 6 Drawing Sheets

SYSTEMS AND METHODS FOR MONITORING APPLICATION RESOURCE USAGE ON MOBILE COMPUTING SYSTEMS

BACKGROUND

With the rise of mobile computing, consumers may now perform traditional computing tasks anywhere. Mobile computing devices such as cellular telephones, tablet computers, e-book readers, and the like have become a ubiquitous part of everyday life. However, the continuing drive for higher performance may place increasing pressure on limited resources such as battery life, even as the drive for smaller form factors and lower costs may limit battery capacities.

Since the utility and reliability of mobile computing devices may depend in large part on battery life, consumers may value mobile applications that consume relatively less battery energy. Unfortunately, traditional mobile computing devices may provide no means for determining the impact of a given mobile application on the rate of battery energy consumption. Additionally, traditional techniques for profiling the resource usage of applications on desktop computing devices may not be effective on many mobile platforms. For example, traditional techniques for profiling the resource usage of applications on desktop computing devices may monitor applications for the percentage of processor time each application consumes. However, these traditional techniques may not apply on mobile computing platforms that devote the majority of processor time to a single foreground application. Accordingly, the instant disclosure identifies and addresses a need for additional and improved systems and methods for monitoring application resource usage on mobile computing systems.

SUMMARY

As will be described in greater detail below, the instant disclosure generally relates to systems and methods for monitoring application resource usage on mobile computing systems by determining frequency levels at which a processor of a mobile computing device operates while a specified application executes as the foreground application on the mobile computing device. In one example, a computer-implemented method for monitoring application resource usage on mobile computing systems may include 1) identifying a mobile computing system that is configured to execute one application at a time as a foreground application, 2) identifying a request to determine a resource consumption level of an application on the mobile computing system, 3) identifying, in response to the request, at least one frequency level at which a processor of the mobile computing system operates while the application executes as the foreground application, and 4) determining, based on the identified frequency level, the resource consumption level of the application.

In some examples, identifying the frequency level may include identifying an amount of time during which the processor of the mobile computing system operates at each of a plurality of frequency levels. In these examples, identifying the frequency level may additionally include identifying a percentage of time during which the processor of the mobile computing system operates at each of the plurality of frequency levels based on the amount of time during which the processor of the mobile computing system operates at each of the plurality of frequency levels.

In some embodiments, identifying the frequency level may include 1) identifying a first amount of time in which the processor of the mobile computing system has operated at the frequency level when the mobile computing system begins executing the application as the foreground application, 2) identifying a second amount of time in which the processor of the mobile computing system has operated at the frequency level when the mobile computing system ceases executing the application as the foreground application, and 3) identifying a difference between the second amount of time and the first amount of time. In these embodiments, identifying the frequency level may additionally include 1) identifying a third amount of time in which the processor of the mobile computing system has operated at the frequency level when the mobile computing system begins again executing the application as the foreground application, 2) identifying a fourth amount of time in which the processor of the mobile computing system has operated at the frequency level when the mobile computing system ceases again executing the application as the foreground application, 3) identifying an additional difference between the second amount of time and the first amount of time, and 4) averaging the difference with the additional difference.

In one example, identifying the frequency level may include reading the frequency level from a proc file system of the mobile computing system. Additionally or alternatively, identifying the frequency level may include requesting the frequency level from a service of the mobile computing system.

In some examples, determining the resource consumption level of the application may include determining a power consumption level of the application. In at least one example, the computer-implemented method may also include providing the resource consumption level of the application to a profile of the application for display in an application store.

In one embodiment, a system for implementing the above-described method may include 1) an identification module programmed to identify a mobile computing system, the mobile computing system being configured to execute one application at a time as a foreground application, 2) a request module programmed to identify a request to determine a resource consumption level of an application on the mobile computing system, 3) a frequency module programmed to identify, in response to the request, at least one frequency level at which a processor of the mobile computing system operates while the application executes as the foreground application, and 4) a determination module programmed to determine, based on the identified frequency level, the resource consumption level of the application. The system may also include at least one processor configured to execute the identification module, the request module, the frequency module, and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a mobile computing system that is configured to execute one application at a time as a foreground application, 2) identify a request to determine a resource consumption level of an application on the mobile computing system, 3) identify, in response to the request, at least one frequency level at which a processor of the mobile computing system operates while the application executes as the foreground application, and 4) determine, based on the identified frequency level, the resource consumption level of the application.

As will be explained in greater detail below, by determining frequency levels at which a processor of a mobile computing device operates while a specified application executes as the foreground application on the mobile computing device, the systems and methods described herein may calculate, estimate, and/or otherwise indicate the expected rate of battery energy consumption of the specified application. By providing information about the rate of battery energy consumption of applications, these systems and methods may allow users to identify more battery-efficient applications, thereby potentially extending the battery life of mobile computing devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
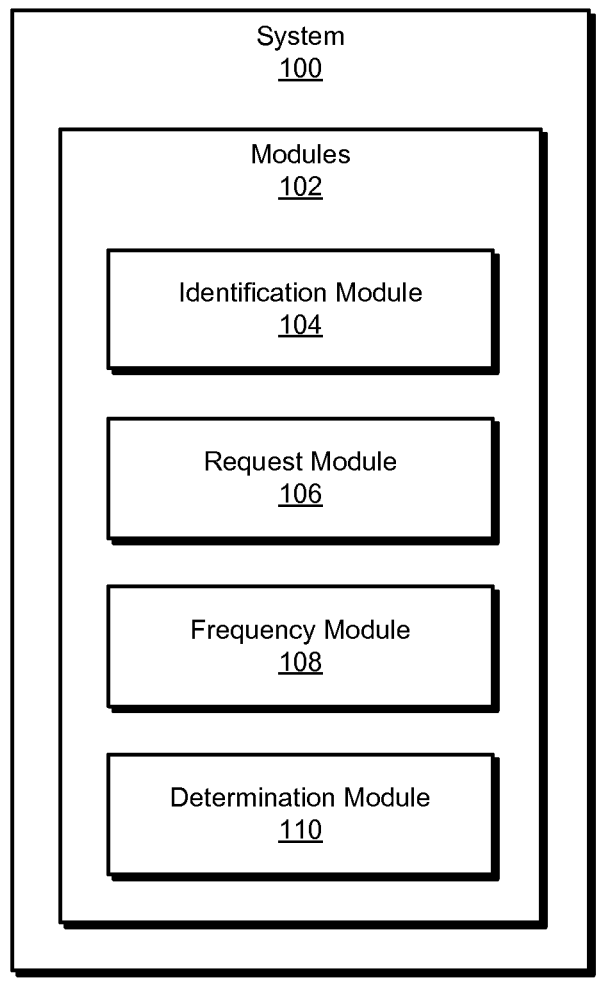
FIG. 1 is a block diagram of an exemplary system for monitoring application resource usage on mobile computing systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
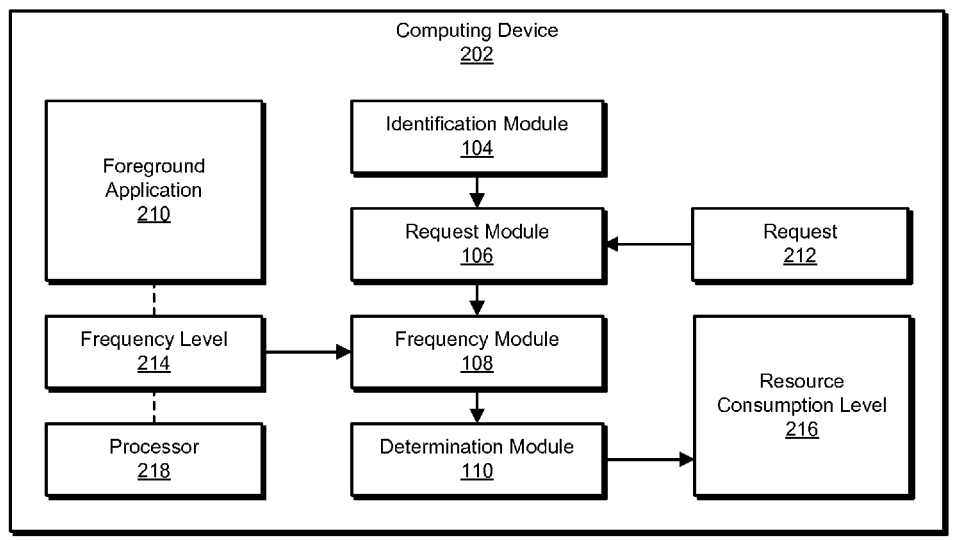
FIG. 2 is a block diagram of an exemplary system for monitoring application resource usage on mobile computing systems.

The following will provide, with reference to FIGS. 1-2, detailed descriptions of exemplary systems for monitoring application resource usage on mobile computing systems. Detailed descriptions of corresponding computer-implemented methods will also be provided in connection with FIG. 3. Detailed descriptions of exemplary frequency distributions for processors of mobile computing devices will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for monitoring application resource usage on mobile computing systems. As illustrated in this figure, exemplary system 100 may include one or more modules 102 for performing one or more tasks. For example, and as will be explained in greater detail below, exemplary system 100 may include an identification module 104 programmed to identify a mobile computing system, the mobile computing system being configured to execute one application at a time as a foreground application. Exemplary system 100 may also include a request module 106 programmed to identify a request to determine a resource consumption level of an application on the mobile computing system.

In addition, and as will be described in greater detail below, exemplary system 100 may include a frequency module 108 programmed to identify, in response to the request, at least one frequency level at which a processor of the mobile computing system operates while the application executes as the foreground application. Exemplary system 100 may also include a determination module 110 programmed to determine, based on the identified frequency level, the resource consumption level of the application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 (e.g., a mobile computing device) configured to execute a foreground application 210.

In one embodiment, one or more of modules 102 from FIG. 1 may, when executed by at least one processor of computing device 202, facilitate computing device 202 in monitoring application resource usage on mobile computing systems. For example, and as will be described in greater detail below, one or more of modules 102 may cause computing device 202 to 1) identify a computing device 202 that is configured to execute one application at a time as a foreground application (e.g., foreground application 210), 2) identify a request 212 to determine a resource consumption level 216 of foreground application 210 on computing device 202, 3) identify, in response to request 212, at least one frequency level 214 at which a processor 218 of computing device 202 operates while foreground application 210 executes as the foreground application, and 4) determine, based on the identified frequency level 214, resource consumption level 216 of foreground application 210.

Computing device 202 generally represents any type or form of computing device capable of reading computer-executable instructions. Examples of computing device 202 include, without limitation, cellular phones, tablets, e-book readers, personal digital assistants (PDAs), multimedia players, global positioning systems, embedded systems, laptops, desktops, servers, combinations of one or more of the same, exemplary computing system 510 in FIG. 5, or any other suitable computing device.

Figure 3:
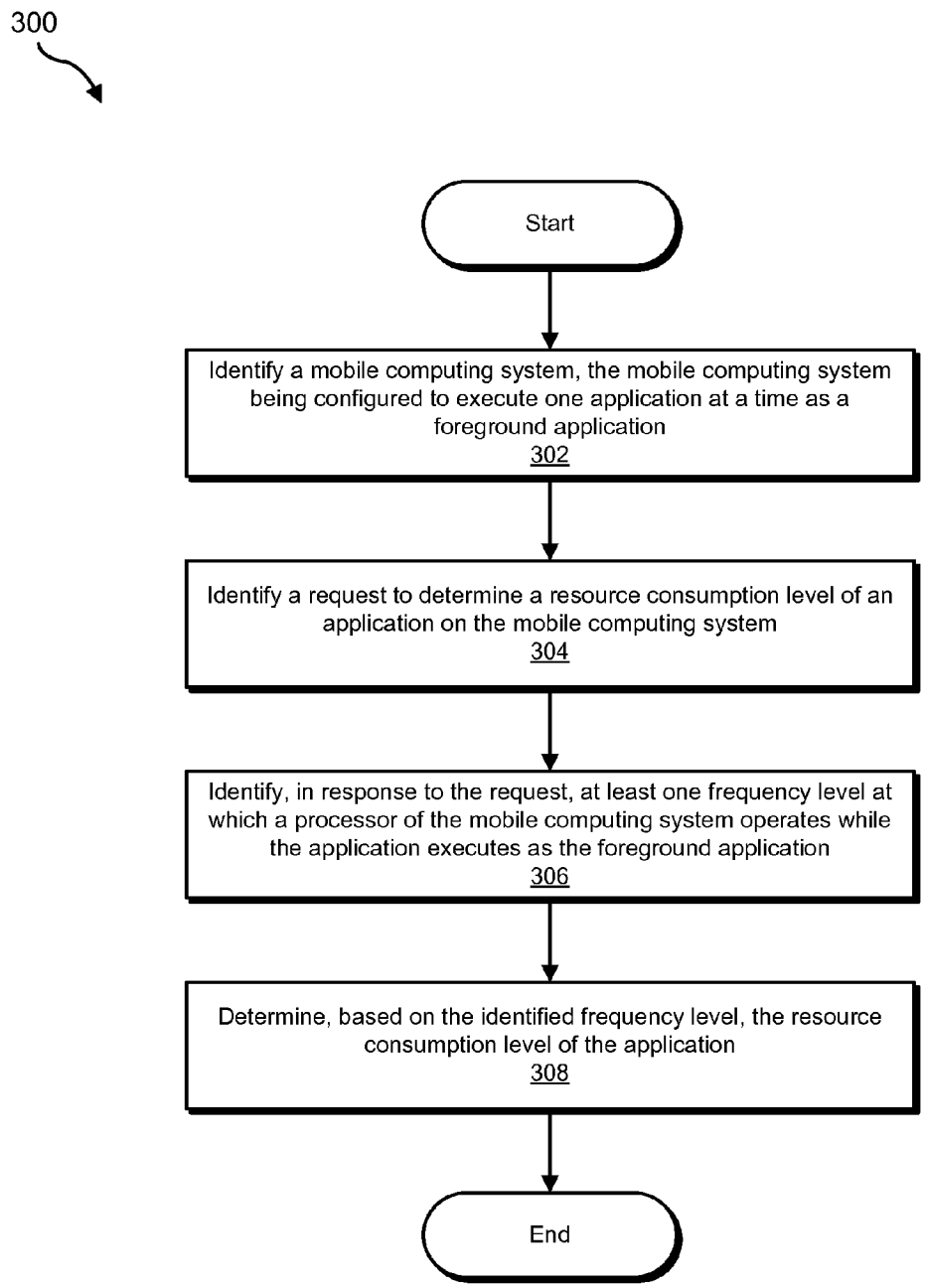
FIG. 3 is a flow diagram of an exemplary method for monitoring application resource usage on mobile computing systems.

FIG. 3 is a flow diagram of an exemplary computer-implemented method 300 for monitoring application resource usage on mobile computing systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a mobile computing system that is configured to execute one application at a time as a foreground application. For example, at step 302 identification module 104 may, as part of computing device 202 in FIG. 2, identify computing device 202 that is configured to execute one application at a time as a foreground application (e.g., foreground application 210).

As previously noted, a mobile computing system may include a mobile phone, a tablet computer, an e-book reader, a personal digital assistant, and the like. The phrase "mobile computing system" may also generally refer to any other portable device and/or other computing device that may operate on battery power and/or that may execute one application at a time in the foreground. Mobile computing systems may include GPS devices, messaging devices, and various other types of mobile devices.

As used herein, the phrase "foreground application" may refer to any application that is currently displayed and/or currently prominently displayed on the mobile computing system. Additionally or alternatively, the phrase "foreground application" may refer to an application that is both currently displayed and currently executing. In some examples, the phrase "foreground application" may refer to an application that has the highest execution priority. In some examples, the phrase "foreground application" may exclude system services, system interface programs, and/or interface applications which temporarily overlay and/or share screen space with the current foreground application. In another example, the phrase "foreground application" may refer to any application currently displayed by the mobile computing system. Additionally or alternatively, the phrase "foreground application" may refer to an application whose display consumes more than half of the display area of the mobile computing device.

In some examples, the mobile computing system may be further configured with a foreground application display area for displaying the foreground application. The foreground application display area may be configured to only display the foreground application when a foreground application is running in the foreground. Additionally or alternatively, the foreground application display area may also display global system interface elements (e.g., menus, soft keyboards, taskbars, docking bars, status bars, etc.).

Identification module 104 may identify the mobile computing system in any suitable manner. For example, identification module 104 may identify the mobile computing system by executing on the mobile computing system. Additionally or alternatively, identification module 104 may identify the mobile computing system by identifying a simulation of the mobile computing system.

Returning to FIG. 3, at step 304 one or more of the systems described herein may identify a request to determine a resource consumption level of an application on the mobile computing system. For example, at step 304 request module 106 may, as part of computing device 202 in FIG. 2, identify request 212 to determine resource consumption level 216 of foreground application 210 on computing device 202.

Request module 106 may identify the request in any suitable context. For example, request module 106 may identify the request by receiving a message and/or identifying a configuration file specifying the application. Additionally or alternatively, request module 106 may identify the request by determining that the application has begun execution in the foreground.

As used herein, the phrase "resource consumption level" may refer to any suitable metric of resource consumption. For example, the phrase "resource consumption level" may refer to power consumption (e.g., rate of energy consumption) and/or an expected and/or estimated power consumption. Additionally or alternatively, the phrase "resource consumption level" may refer to processor usage. In some examples, the phrase "resource consumption level" may refer to a relative amount of resource consumption, a tier of resource consumption, and/or a resource consumption ranking. In at least one example, the phrase "resource consumption level" may refer to a rate of battery energy consumption and/or a rate of battery energy consumption while the mobile computing system is powered by a battery.

At step 306, in FIG. 3, one or more of the systems described herein may identify, in response to the request, at least one frequency level at which a processor of the mobile computing system operates while the application executes as the foreground application. For example, at step 306 frequency module 108 may, as part of computing device 202 in FIG. 2, identify, in response to request 212, at least one frequency level 214 at which processor 218 of computing device 202 operates while foreground application 210 executes as the foreground application.

As used herein, the phrase "frequency level" may refer to a frequency at which a processor is running, a clock rate of a processor, and/or any configuration of a processor and/or set of processors that affects the rate at which the processor consumes energy and/or causes a mobile computing device to consume energy. In some examples, the mobile computing system may be configured to maintain a lowest possible frequency for executing a foreground application (e.g., in order to conserve battery energy without degrading performance).

Frequency module 108 may identify the frequency level in any of a variety of ways. For example, frequency module 108 may identify the frequency level by identifying an amount of time during which the processor of the mobile computing system operates at each of a plurality of frequency levels. For example, the processor may be configurable to run at two, three, or more frequencies. Accordingly, frequency module 108 may identify an amount of time during which the processor of the mobile computing system operates at one of the frequency levels (e.g., the highest frequency level). Additionally or alternatively, frequency module 108 may identify an amount of time during which the processor of the mobile computing system operates at each of the plurality of frequency levels and then identify an aggregate frequency level (e.g., an average frequency weighted by time spent on each frequency level).

Additionally, in some examples, frequency module 108 may identify the frequency level by identifying a percentage of time during which the processor of the mobile computing system operates at each of the plurality of frequency levels based on the amount of time during which the processor of the mobile computing system operates at each of the plurality of frequency levels. For example, frequency module 108 may identify the total amount of time during which the processor operates and divide the amount of time during which the processor operates at each of the plurality of frequency levels by the total amount of time to obtain a percentage of time for each of the plurality of frequency levels.

In some examples, frequency module 108 may identify the frequency level by 1) identifying a first amount of time in which the processor of the mobile computing system has operated at the frequency level when the mobile computing system begins executing the application as the foreground application, 2) identifying a second amount of time in which the processor of the mobile computing system has operated at the frequency level when the mobile computing system ceases executing the application as the foreground application, and 3) identifying a difference between the second amount of time and the first amount of time. For example, frequency module 108 may identify historical processor frequency information when the foreground application is launched, brought into the foreground, and/or resumed. Frequency module 108 may again identify historical processor frequency information when the foreground application is terminated, taken from the background, and/or suspended. By comparing the historical processor frequency information at the beginning and end of the execution of the foreground application, frequency module 108 may determine frequencies at which the processor operated while the foreground application executed. In some examples, frequency module 108 may sample the historical processor frequency information some time after the foreground application is brought into the foreground and/or some time before the foreground application leaves the foreground. Generally, frequency module 108 may sample the historical processor frequency information at any two points of time between which the foreground application has executed continuously in the foreground.

Additionally, in some examples, frequency module 108 may take additional samples to ensure an accurate representation of the effect of the application on the frequency level of the processor. For example, frequency module 108 may 1) identify a third amount of time in which the processor of the mobile computing system has operated at the frequency level when the mobile computing system begins again executing the application as the foreground application, 2) identify a fourth amount of time in which the processor of the mobile computing system has operated at the frequency level when the mobile computing system ceases again executing the application as the foreground application, 3) identify an additional difference between the second amount of time and the first amount of time, and 4) average the difference with the additional difference. By observing the apparent relative impact of the application on the frequency level of the processor over multiple periods of time (and aggregating these observations, e.g., by averaging the observations), frequency module 108 may improve the accuracy and/or reliability of future determinations about the resource consumption level of the application.

Frequency module 108 may identify the frequency level in any of a variety of ways. For example, frequency module 108 may read the frequency level from a proc file system of the mobile computing system. As used herein, the phrase "proc file system" may refer to any file system that provides system information (e.g., process information, processor information, etc.) via a file-based interface.

In some examples, frequency module 108 may identify the frequency level by requesting the frequency level from a service of the mobile computing system. For example, frequency module 108 may send a message to the service and/or access an application programming interface of the service to retrieve the frequency level (e.g., the amount time spent by the processor at one or more frequency levels).

Figure 4:
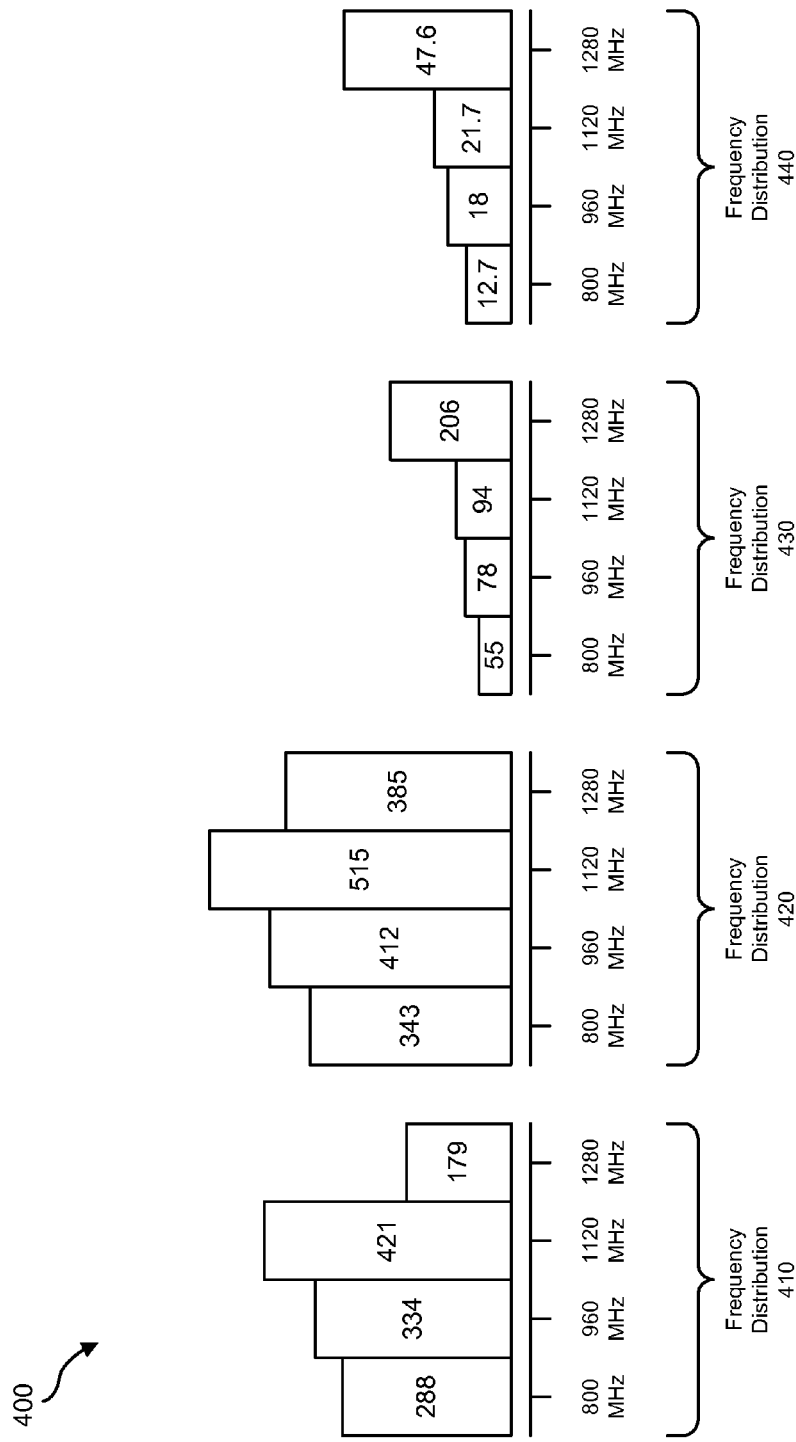
FIG. 4 is an illustration of exemplary frequency distributions for processors of mobile computing systems.

FIG. 4 illustrates an exemplary set of frequency distributions 400. As shown in FIG. 4, frequency distributions 400 may include a frequency distribution 410, a frequency distribution 420, a frequency distribution 430, and a frequency distribution 440. Frequency distribution 410 may represent a historical amount of time (e.g., since the mobile computing system last booted) spent by the processor at each of four frequency levels: 800 megahertz ("MHz"), 960 MHz, 1120 MHz, and 1280 MHz. For example, at the time frequency module 108 captured frequency distribution 410, the processor may have spent 288 minutes at 800 MHz, 334 minutes at 960 MHz, 421 minutes at 1120 MHz, and 179 minutes at 1280 MHz. In some examples, frequency module 108 may retrieve frequency distribution 410 when the foreground application begins executing in the foreground. Additionally or alternatively, frequency distribution 410 may represent an aggregate of recorded frequency distributions, each of which frequency module 108 may have captured when the foreground application began and/or resumed executing in the foreground. When the foreground application ceases executing in the foreground, frequency module 108 may retrieve frequency distribution 420. Additionally or alternatively, frequency distribution 420 may represent an aggregate of recorded frequency distributions, each of which frequency module 108 may have captured when the foreground application was terminated and/or ceased executing in the foreground. After identifying frequency distribution 420, frequency module 108 may generate frequency distribution 430 by calculating the difference between the time spent at each frequency level for the respective frequency distributions 420 and 410. For example, frequency module 108 may determine that the processor spent 55 minutes at 800 MHz while the foreground application executed in the foreground by subtracting 288 from 343. After identifying the frequency distribution 430, in some examples frequency module 108 may determine the relative amount of time spent by the processor at each frequency level while the foreground application executed in the foreground (e.g., a percentage of the time at each frequency level). For example, frequency module 108 may determine that the processor spent $206/(55+78+94+206) \approx 47.6\%$ of the time running at 1280 MHz.

Returning to FIG. 3, at step 308 one or more of the systems described herein may determine, based on the identified frequency level, the resource consumption level of the application. For example, at step 308 determination module 110 may, as part of computing device 202 in FIG. 2, determine, based on the identified frequency level 214, the resource consumption level 216 of foreground application 210.

Determination module 110 may determine the resource consumption level of the application in any suitable manner. For example, as mentioned earlier, determination module 110 may determine a power consumption level of the application based on the identified frequency level and/or levels at which the processor executed. In some examples, determination module 110 may determine the power consumption level by applying the relative amount of time spent by the processor at each frequency level to a known rate of energy consumption for each frequency level (e.g., as specified in a processor database and/or as observed by one or more of the system described herein over time). Additionally or alternatively, determination module 110 may determine the power consumption level of the application by estimating the expected power consumption level of the application based on the frequency level (e.g., by assuming a linear relationship between the frequency level and the rate of energy consumption). In some examples, determination module 110 may additionally project the rate of energy consumption of the application by combining a projection of processor-related energy consumption with a projection of energy consumption based on one or more additional functions of the application. For example, determination module 110 may determine that the application uses one or more radio transmission and/or reception devices (e.g., global positioning devices, WLAN devices, BLUETOOTH devices, etc.) and determine an expected rate of energy consumption by these devices.

In some examples, determination module 110 may additionally provide and/or display the resource consumption level of the application. For example, determination module 110 may generate a report of the resource consumption level of the application. Additionally or alternatively, determination module 110 may display the resource consumption level of the application to a user of the mobile computing system. In some examples, determination module 110 may transmit the resource consumption level of the application to a developer, a publisher, and/or a vendor of the application.

In some examples, determination module 110 may provide the resource consumption level of the application to an application store. For example, determination module 110 may provide the resource consumption level of the application to a profile of the application for display in the application store. In this example, determination module 110 may provide the resource consumption level to the application store in any suitable format, and the application store may display the resource consumption level in any suitable format. For example, the application store may display an estimate of how quickly the application will drain a battery. As another example, the application store may display a rating (e.g., a score, a number of stars, etc.) for the resource consumption level. In some examples, the application store may compare the resource consumption level of the application with one or more additional applications in the application store. For example, the application store may recommend the application over an alternative application (e.g., the alternatively application being in the same category and/or having the same functionality as the application) based on the resource consumption level, and/or display the relative resource consumption levels of the application and the alternative application side-by-side. In some examples, determination module 110 may identify an average resource consumption profile of a plurality of applications.

As explained above, by determining frequency levels at which a processor of a mobile computing device operates while a specified application executes as the foreground application on the mobile computing device, the systems and methods described herein may calculate, estimate, and/or otherwise indicate the expected rate of battery energy consumption of the specified application. By providing information about the rate of battery energy consumption of applications, these systems and methods may allow users to identify more battery-efficient applications, thereby potentially extending the battery life of mobile computing devices.

Figure 5:
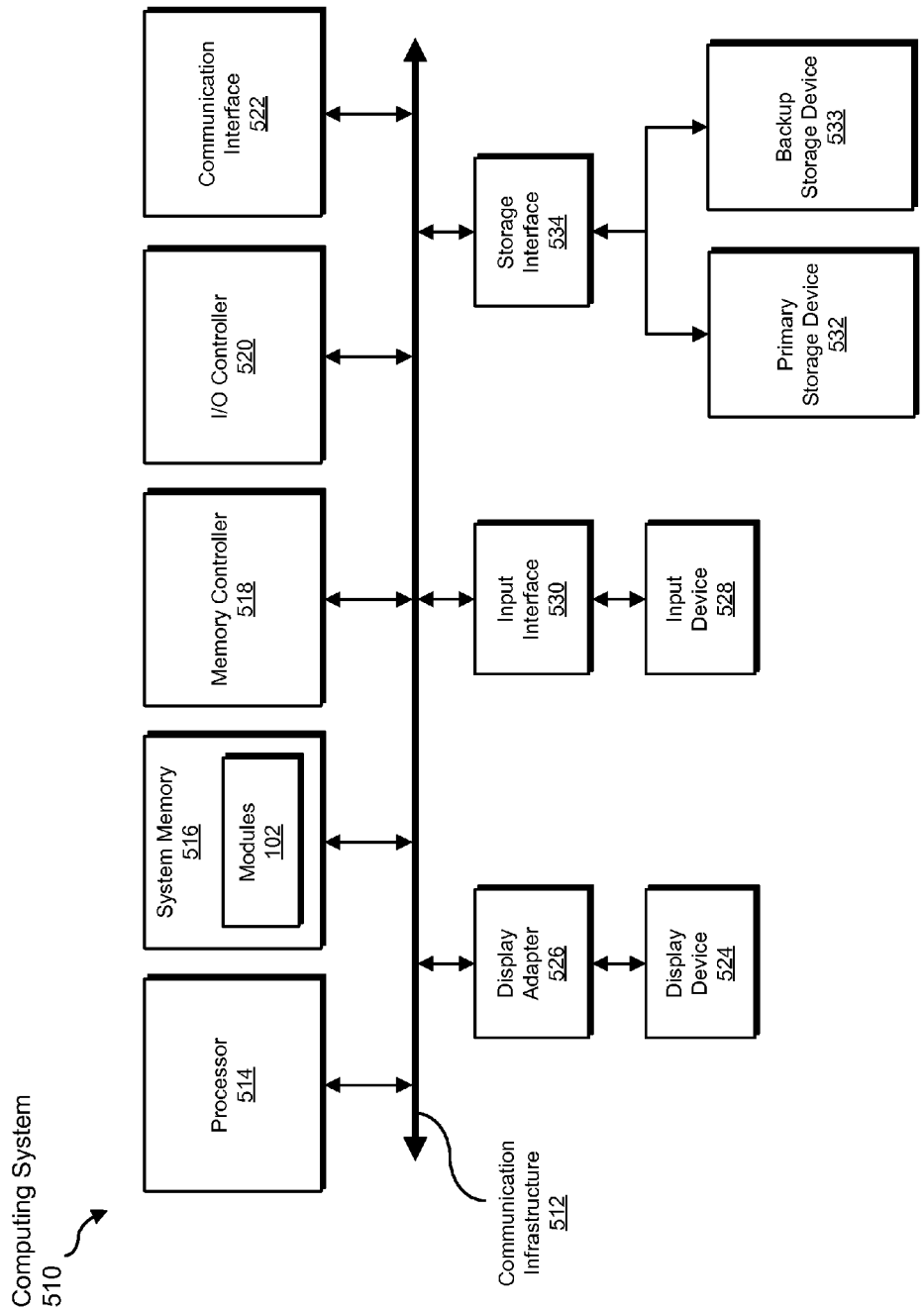
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, reading, requesting, determining, and providing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
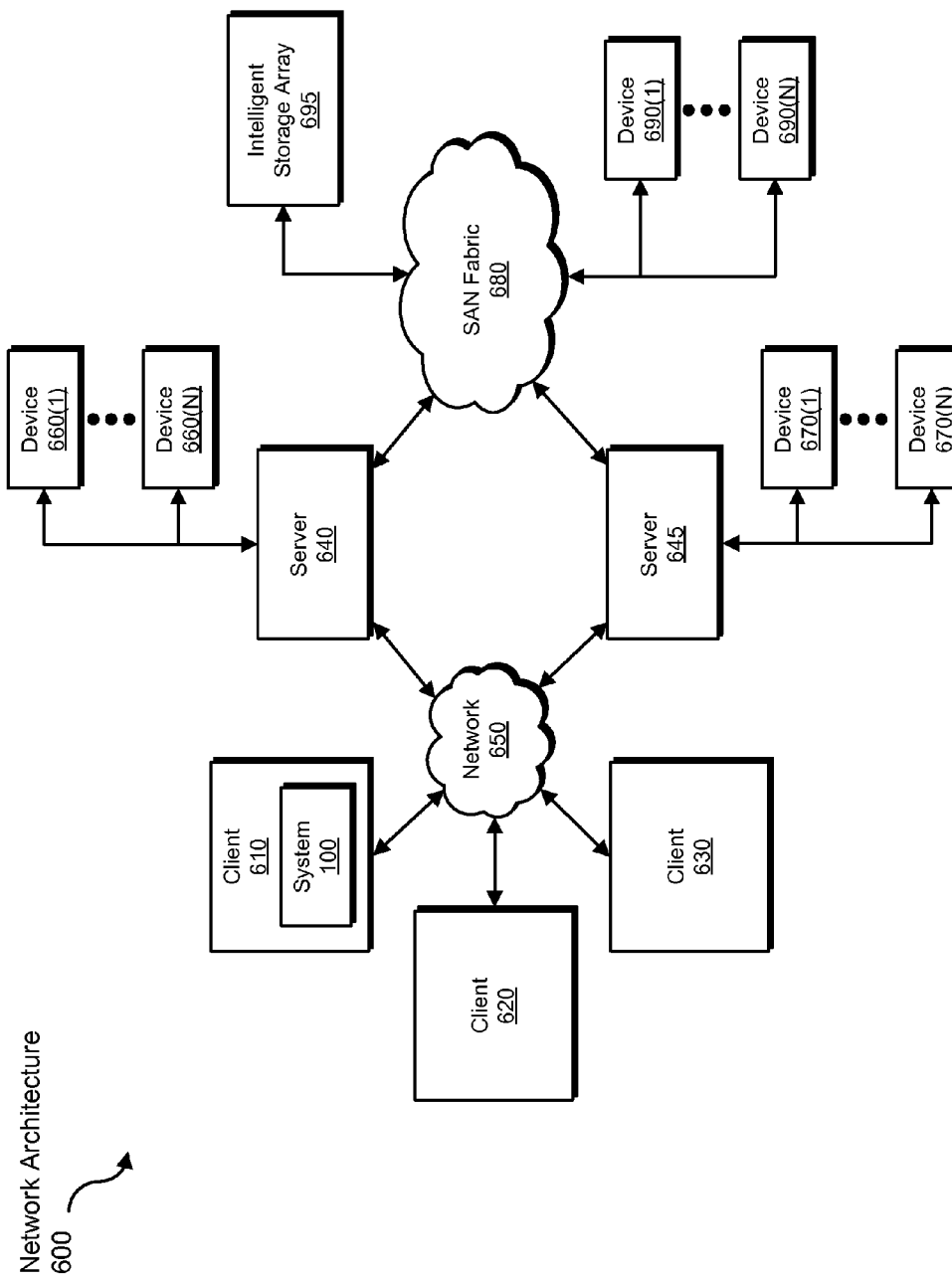
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, reading, requesting, determining, and providing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for monitoring application resource usage on mobile computing systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for monitoring application resource usage on mobile computing systems.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for monitoring application resource usage on a mobile computing system, at least a portion of the method being performed by a computing device comprising at least one processor, the method comprising:
- identifying, by the computing device, the mobile computing system by at least one of:
  - executing on the mobile computing system, or
  - identifying a simulation of the mobile computing system;
  - wherein the mobile computing system is being configured to execute a plurality of applications, wherein only one application of the plurality of applications is executed, at a time, as a foreground application, wherein the foreground application is configured to run in a foreground of the mobile computing system, consume more than half of a display area of the mobile computing system, and have the highest execution priority, at the time;
- identifying, by the computing device, a request to determine a power consumption level of the foreground application on the mobile computing system;
- identifying, by the computing device, in response to the request, at least one clock rate of a number of clock rates at which a processor of the mobile computing system operates while executing the foreground application;
- determining, by the computing device, the power consumption level of the foreground application by applying a relative amount of time spent by the processor of the mobile computing system, operating on the foreground application, at each of the at least one clock rate to a known rate of energy consumption for each clock rate at which the processor operates, wherein the known rate of energy consumption for each clock rate at which the processor operates is specified in a processor database; and
- providing the power consumption level of the foreground application for display in at least one of:
  - an application store; and
  - a report to a user of the mobile computing system.

2. The computer-implemented method of claim 1, wherein identifying the clock rate comprises identifying an amount of time during which the processor of the mobile computing system operates at each of a plurality of clock rates.

3. The computer-implemented method of claim 2, further comprising identifying a percentage of time during which the processor of the mobile computing system operates at each of the plurality of clock rates based on the amount of time during which the processor of the mobile computing system operates at each of the plurality of clock rates.

4. The computer-implemented method of claim 1, wherein identifying the clock rate comprises:
- identifying a first amount of time in which the processor of the mobile computing system has operated at the clock rate when the mobile computing system begins executing the foreground application;
- identifying a second amount of time in which the processor of the mobile computing system has operated at the clock rate when the mobile computing system ceases executing the foreground application;
- identifying a difference between the second amount of time and the first amount of time.

5. The computer-implemented method of claim 4, wherein identifying the clock rate further comprises:
- identifying a third amount of time in which the processor of the mobile computing system has operated at the clock rate when the mobile computing system begins again executing the foreground application;
- identifying a fourth amount of time in which the processor of the mobile computing system has operated at the clock rate when the mobile computing system ceases again executing the foreground application;
- identifying an additional difference between the fourth amount of time and the third amount of time;
- averaging the difference with the additional difference.

6. The computer-implemented method of claim 1, wherein determining the power consumption level of the foreground application further comprises combining a projection of power consumed by the processor while the foreground application executes with a projection of power consumed by non-processor components of the mobile computing system while the foreground application executes.

7. The computer-implemented method of claim 1, wherein identifying the clock rate at which the processor of the mobile computing system operates comprises reading the clock rate from a proc file system of the mobile computing system.

8. The computer-implemented method of claim 1, wherein identifying the clock rate at which the processor of the mobile computing system operates comprises requesting the clock rate from a service of the mobile computing system.

9. The computer-implemented method of claim 1, wherein the power consumption level of the foreground application is provided to a profile of the foreground application.

10. A system for monitoring application resource usage on mobile computing systems, the system comprising:
- an identification module, stored in memory, that identifies a mobile computing system by at least one of:
  - executing on the mobile computing system, or
  - identifying a simulation of the mobile computing system;
- wherein the mobile computing system is being configured to execute a plurality of applications, wherein only one application of the plurality of applications is executed, at a time, as a foreground application, wherein the foreground application is configured to run in a foreground of the mobile computing system, consume more than half of a display area of the mobile computing system, and have the highest execution priority, at the time;
- a request module, stored in memory, that identifies a request to determine a power consumption level of the foreground application on the mobile computing system;
- a frequency module, stored in memory, that identifies, in response to the request, at least one clock rate of a number of clock rates at which a processor of the mobile computing system operates while executing the foreground application;
- determination module, stored in memory, that determines the power consumption level of the foreground application by applying a relative amount of time spent by the processor of the mobile computing system, operating on the foreground application, at each of the at least one clock rate to a known rate of energy consumption for each clock rate at which the processor operates, wherein the known rate of energy consumption for each clock rate at which the processor operates is specified in a processor database; and the determination module provides the power consumption level of the foreground application for display in at least one of:
  - an application store; and
  - a report to a user of the mobile computing system;
- at least one processor configured to execute the identification module, the request module, the frequency module, and the determination module.

11. The system of claim 10, wherein the frequency module identifies the clock rate by identifying an amount of time during which the processor of the mobile computing system operates at each of a plurality of clock rates.

12. The system of claim 11, wherein the determination module further identifies a percentage of time during which the processor of the mobile computing system operates at each of the plurality of clock rates based on the amount of time during which the processor of the mobile computing system operates at each of the plurality of clock rates.

13. The system of claim 10, wherein the frequency module identifies the clock rate by:
    identifying a first amount of time in which the processor of the mobile computing system has operated at the clock rate when the mobile computing system begins executing the foreground application;
    identifying a second amount of time in which the processor of the mobile computing system has operated at the clock rate when the mobile computing system ceases executing the foreground application;
    identifying a difference between the second amount of time and the first amount of time.

14. The system of claim 13, wherein the frequency module further identifies the clock rate by:
    identifying a third amount of time in which the processor of the mobile computing system has operated at the clock rate when the mobile computing system begins again executing the foreground application;
    identifying a fourth amount of time in which the processor of the mobile computing system has operated at the clock rate when the mobile computing system ceases again executing the foreground application;
    identifying an additional difference between the fourth amount of time and the third amount of time;
    averaging the difference with the additional difference.

15. The system of claim 10, wherein the determination module further determines the power consumption level of the foreground application by combining a projection of power consumed by the processor while the foreground application executes with a projection of power consumed by non-processor components of the mobile computing system while the foreground application executes.

16. The system of claim 10, wherein the frequency module identifies the clock rate at which the processor of the mobile computing system operates by reading the clock rate from a proc file system of the mobile computing system.

17. The system of claim 10, wherein the frequency module identifies the clock rate at which the processor of the mobile computing system operates by requesting the clock rate from a service of the mobile computing system.

18. The system of claim 10, wherein the determination module further provides the power consumption level of the foreground application to a profile of the foreground application.

19. A non-transitory computer-readable-storage medium comprising one or more computer-executable instructions that, when executed by at least one processor of a computing device, cause the computing device to:
    identify a mobile computing system by at least one of:
        executing on the mobile computing system, or
        identifying a simulation of the mobile computing system;
    wherein the mobile computing system is being configured to execute a plurality of applications, wherein only one application of the plurality of applications is executed, at a time, as a foreground application, wherein the foreground application is configured to run in a foreground of the mobile computing system, consume more than half of a display area of the mobile computing system, and have the highest execution priority, at the time;
    identify a request to determine a power consumption level of the foreground application on the mobile computing system;
    identify, in response to the request, at least one clock rate of a number of clock rates at which a processor of the mobile computing system operates while executing the foreground application;
    determine, by the computing device, the power consumption level of the foreground application by applying a relative amount of time spent by the processor of the mobile computing system, operating on the foreground application, at each of the at least one clock rate to a known rate of energy consumption for each clock rate at which the processor operates, wherein the known rate of energy consumption for each clock rate at which the processor operates is specified in a processor database; and
    provides the power consumption level of the foreground application for display in at least one of:
    an application store; and
    a report to a user of the mobile computing system.

20. The non-transitory computer-readable-storage medium of claim 19, wherein the one or more computer-executable instructions are programmed to cause the computing device to identify the clock rate by causing the computing device to identify an amount of time during which the processor of the mobile computing system operates at each of a plurality of clock rates.

* * * * *

UNITED STATES PATENT AND TRADEMARK OFFICE
CERTIFICATE OF CORRECTION

| | | |
|---|---|---|
| PATENT NO. | : 9,118,520 B1 | Page 1 of 1 |
| APPLICATION NO. | : 13/452719 | |
| DATED | : August 25, 2015 | |
| INVENTOR(S) | : Mao | |

It is certified that error appears in the above-identified patent and that said Letters Patent is hereby corrected as shown below:

In the claims

Claim 10, column 16, line 50, should read:
a determination module, stored in memory, that determines Signed and Sealed this
Fifteenth Day of March, 2016

Michelle K. Lee
*Director of the United States Patent and Trademark Office*